B. J. GRIGSBY.
EXTENSION LAMP MOUNTING FOR VEHICLES.
APPLICATION FILED OCT. 31, 1917.
1,389,585. Patented Sept. 6, 1921.
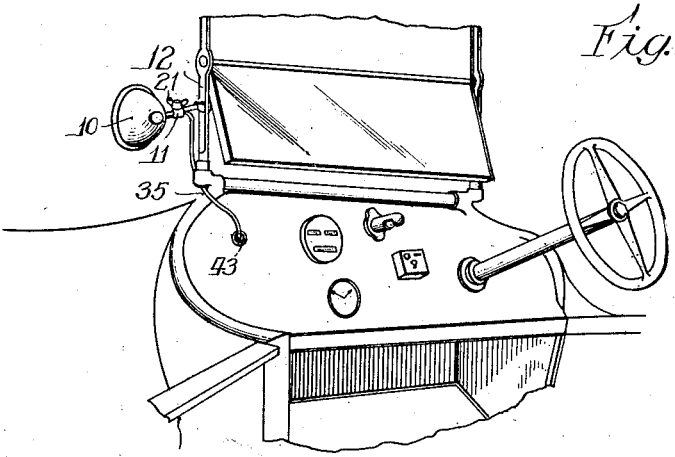
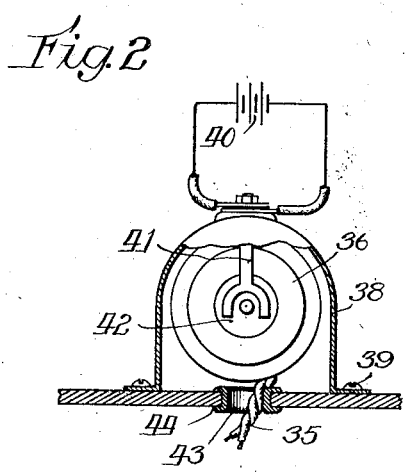
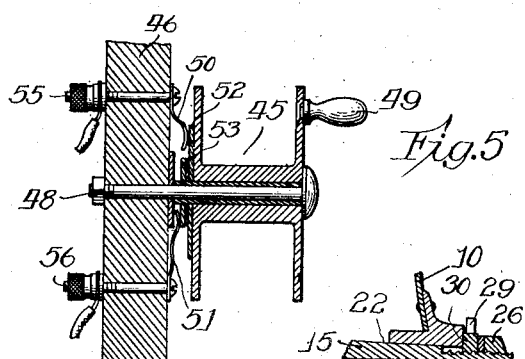
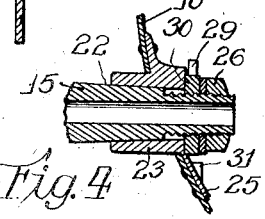
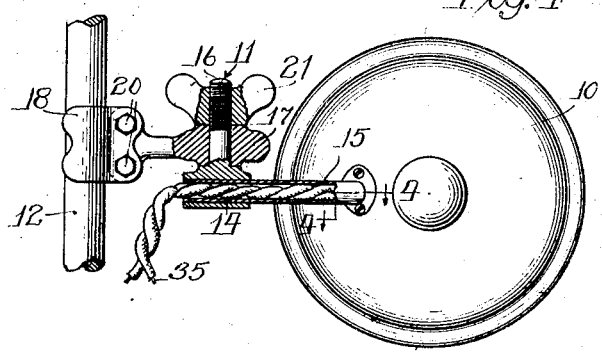
Witness.
Chas. R. Koursh.
Inventor.
Bertram J. Grigsby.
By William H. Hall
Atty.

UNITED STATES PATENT OFFICE.

BERTRAM J. GRIGSBY, OF CHICAGO, ILLINOIS, ASSIGNOR TO ANDERSON ELECTRIC & EQUIPMENT CO., OF CHICAGO, ILLINOIS, A CORPORATION OF ILLINOIS.

EXTENSION-LAMP MOUNTING FOR VEHICLES.

1,389,585. Specification of Letters Patent. Patented Sept. 6, 1921.

Application filed October 31, 1917. Serial No. 199,478.

*To all whom it may concern:*

Be it known that I, BERTRAM J. GRIGSBY, a citizen of the United States, and a resident of Chicago, in the county of Cook and State of Illinois, have invented certain new and useful Improvements in Extension-Lamp Mountings for Vehicles; and I do hereby declare that the following is a full, clear, and exact description thereof, reference being had to the accompanying drawings, and to the characters of reference marked thereon, which form a part of this specification.

This invention relates to a novel extension lamp for vehicles, especially adaptable for automobiles, of that character in which the lamp itself is detachably mounted on the vehicles and in which there is provided a length of conductor cord that normally is contained on a reel or like take-up device and is of such length as to permit the lamp, when detached, to be moved to any part of the vehicle or to be otherwise used about the vehicle within the length of the cord.

Among the objects of the invention is to provide a lamp which normally is stationed or securely attached to position on a vehicle in a manner commonly followed, in combination with a simple detachable bracket or supporting means and a suitable length of conductor cord, normally wound on a reel to permit the moving of the lamp when detached to any required length from the point of attachment of the cord to the source of energy. In order to provide for the proper protection of the length of conductor cord when not in use, a housing or container, or a take-up device, such as a mechanical or hand-operated reel, is provided. This may be permanently attached to any convenient part of the vehicle inside or outside of same, and supported separately from the lamp.

The lamp may be attached to any usual part of the vehicle. If on a motor car, it may be a side lamp, head lamp, tail lamp, windshield lamp, or the like. For the purposes of describing my invention, I will use the windshield lamp as an example.

In the drawings:—

Figure 1 is a partial perspective view of an automobile, showing the manner of applying my lamp thereto.

Fig. 2 is a detail section of a portion of the dash, showing one form of take-up reel and container therefor.

Fig. 3 is an enlarged rear elevation of the lamp with parts shown in section.

Fig. 4 is a section on the line 4—4 of Fig. 3, showing the manner of attaching the lamp casing to the bracket.

Fig. 5 illustrates another form of take-up reel.

As shown in the drawings, 10 designates the lamp casing; 11 designates as a whole a supporting bracket therefor and 12 designates one of the windshield frame posts. The bracket 11, when the lamp is employed as a windshield frame supported spot lamp, is so constructed as to permit the lamp casing to be turned through large angles both in horizontal and vertical directions so as to give the lamp an almost universal movement.

The particular form of bracket herein shown embraces a T-shape member, the cross arm 14 of which is shown as made hollow and having at one end an extension 15 that is connected to the lamp casing in a manner to be hereinafter described. The central member or stud 16 is screw threaded and extends upwardly through an opening in a bracket member 17 so as to rotate therein. Said bracket member is provided with clamping fingers 18 of any suitable type which are clamped on the windshield frame post 12 through the medium of clamping bolts 20. The shank or stud 16 of the T-shape bracket member is normally locked in place by means of a thumb nut 21.

The longer portion 15 of the cross arm of said T-shape fitting 14 is tapered at 22 to enter a bushing 23 that is seated in an opening in the adjacent side of the lamp casing and may be attached thereto in any suitable manner, as by means of a flange 25 within the casing that is suitably shaped to fit the curvature of the casing. The flange may be soldered or riveted to the casing. The inner end of the tapered portion of the member 15 is threaded to receive a nut 26. By reason of the tapered portion 22 of the bracket arm and of the bushing 23 the nut 26 serves to force said tapers together and to hold the casing reliably in place to maintain a given adjustment of the casing with respect to the bracket, while permitting the casing to be adjusted in vertical directions about the longitudinal axis of the arm 15. A stop 29, extended from a washer 30, that is non-rotatively fixed to the threaded portion 22 of the arm, is arranged to engage a stop lug 31 on the flange 25 to limit the turning movement of the casing about the axis of said arm 15.

The conductor cord 35 extends from the lamp casing through the hollow cross arm of the T-member 14 and is adapted to be wound upon a reel or like take-up device which may be mounted on any convenient portion of the vehicle. As shown in Fig. 2 the reel is mounted on the dash, in front thereof and within the cowl. Said reel is designated as a whole by 36 and is rotatively supported within a container or receptacle 38 that is fastened, as by means of screws 39, to the forward face of the dash. The particular type of reel employed is not important in respect of the present invention, and the details thereof will not be described, except to state that the reel shown in Fig. 2 is an automatic winding reel and the shaft thereof is mounted in the end walls of the casing or receptacle 38. Current from a suitable source of supply, designated by 40, is carried to the conductors of the cord 35 through fixed terminal fingers 41 and conductor disks 42 that are fixed to the end faces of and rotate with the reel. The dash is provided with an opening 43 through which the conductor cord extends, and the edge of said opening is preferably bound by a suitable non-friction washer or eyelet 44 to minimize friction on the cord.

In Fig. 5 is shown a hand operated reel 45 that is mounted on any convenient fixed portion 46 of the vehicle. Said reel 45 rotates on a fixed shaft 48 and is provided with a handle 49 to rotate it. Current may be carried to the conductors of the cord through fixed resilient terminal fingers 50 and 51 that contact with annular conductor members 52, 53, respectively, of unequal diameters that are fixed in any suitable manner to and rotate with the reel. The terminal fingers are connected to binding posts 55, 56 that are in turn connected to the source of electric energy.

In the normal use of the lamp it occupies its fixed station or position on the vehicle, depending upon the character or function of the lamp. In the illustrated embodiment of the invention, when it is desired to use the lamp as a trouble lamp, or to otherwise extend it from the car for other use, the thumb screw 21 is unscrewed from the stud 16 so as to permit the T-fitting 14 to be detached from the bracket member 17. The lamp is then free to be moved from place to place within the range of the conductor cord 35, and the reel permits the cord to be extended or drawn away therefrom.

An advantage of the construction described is that the extension feature may be applied to standard lamps with little or no change in such lamps to adapt it to the extension function. Further, the construction is such that the appearance of the lamp is not changed.

It will be understood that the structural features are capable of some variation within the spirit and scope of the invention and that the invention is not limited to the exact details shown except as to claims wherein said details are specifically set forth, or as imposed by the prior art.

I claim as my invention:

1. As a new article of manufacture, a combined spot and trouble lamp, comprising a lamp casing, a universal lamp-supporting bracket and a conductor cord take-up device; the bracket comprising a hollow arm adjustably connected to the lamp casing and a rigid arm having a swivel connection with the hollow arm at one end thereof and at the other end provided with means to attach the lamp to a wind shield frame; a lamp cord normally coiled within the take-up device and extending through the hollow arm into the lamp casing; said take-up device having attaching means at one side thereof, to independently attach it to a part of the vehicle, and terminals to electrically connect the inner ends of the lamp cord.

2. An article of manufacture as set forth in claim 1, in which said hollow arm is provided with a portion substantially perpendicular thereto, and the rigid arm is provided with an aperture to receive said perpendicular portion.

In witness whereof I claim the foregoing as my invention, I hereunto append my signature in the presence of two witnesses at Chicago, Illinois, this 22nd day of October, 1917.

BERTRAM J. GRIGSBY.

Witnesses:
W. L. HALL,
M. D. ROBB.